(12) United States Patent
Shin et al.

(10) Patent No.: US 12,352,029 B2
(45) Date of Patent: Jul. 8, 2025

(54) TOILET AND INDIVIDUAL EXCRETA DISPOSAL SYSTEM INCLUDING SAME

(71) Applicant: Samsung Electronics Co., Ltd., Suwon-si (KR)

(72) Inventors: Hyunsuk Shin, Suwon-si (KR); Ginam Kim, Suwon-si (KR); Yongkwon Kim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 283 days.

(21) Appl. No.: 17/927,410

(22) PCT Filed: Jan. 28, 2021

(86) PCT No.: PCT/KR2021/001155
§ 371 (c)(1),
(2) Date: Nov. 23, 2022

(87) PCT Pub. No.: WO2021/241842
PCT Pub. Date: Dec. 2, 2021

(65) Prior Publication Data
US 2023/0193614 A1 Jun. 22, 2023

Related U.S. Application Data

(60) Provisional application No. 63/030,777, filed on May 27, 2020.

(51) Int. Cl.
*E03D 11/11* (2006.01)
*E03D 9/00* (2006.01)
(Continued)

(52) U.S. Cl.
CPC .............. *E03D 11/11* (2013.01); *E03D 9/005* (2013.01); *E03D 9/10* (2013.01); *E03D 11/13* (2013.01)

(58) Field of Classification Search
CPC ......... E03D 11/11; E03D 11/13; E03D 9/005; E03D 9/10
(Continued)

(56) References Cited

U.S. PATENT DOCUMENTS

| 3,329,974 A | 7/1967 | Norman et al. |
| 5,036,554 A * | 8/1991 | Blount .................... E03D 11/11 4/321 |

(Continued)

FOREIGN PATENT DOCUMENTS

| CN | 1280490 C | 10/2006 |
| CN | 108412006 A | 8/2018 |

(Continued)

OTHER PUBLICATIONS

Extended European Search Report issued May 15, 2024 of EP Patent Application No. 21812417.0.

*Primary Examiner* — Huyen D Le
(74) *Attorney, Agent, or Firm* — CANTOR COLBURN LLP

(57) ABSTRACT

A toilet bowl includes a main body defining a urine and feces transfer passage; and a collection member arranged in a first direction from the main body, wherein the main body comprises a urine and feces transfer surface and a urine and feces separation surface arranged in the first direction, wherein the urine and feces separation surface extends along a circumference of the urine and feces transfer passage, and separates mixed urine and feces transferred from the urine and feces transfer surface into liquid urine and feces and solid urine and feces, and wherein the collection member accommodates each of the liquid urine and feces and the solid urine and feces.

15 Claims, 11 Drawing Sheets

(51) Int. Cl.
*E03D 9/10* (2006.01)
*E03D 11/13* (2006.01)

(58) Field of Classification Search
USPC .............................................. 4/321
See application file for complete search history.

(56) References Cited

U.S. PATENT DOCUMENTS

| | | | |
|---|---|---|---|
| 5,400,443 A | 3/1995 | Marino | |
| 7,877,822 B2 | 2/2011 | Wu | |
| 9,854,949 B2 | 1/2018 | Trott et al. | |
| 10,273,674 B2 | 4/2019 | Hall et al. | |
| 11,849,889 B2 * | 12/2023 | Qu | E03D 5/014 |
| 2007/0130678 A1 | 6/2007 | Ikeda et al. | |
| 2013/0191983 A1 * | 8/2013 | Imai | E03D 9/08 |
| | | | 4/321 |
| 2020/0299946 A1 | 9/2020 | Lee et al. | |
| 2021/0140158 A1 | 5/2021 | Bergmann et al. | |

FOREIGN PATENT DOCUMENTS

| | | |
|---|---|---|
| JP | 08260541 A | 10/1996 |
| JP | 2002201693 A | 7/2002 |
| JP | 2003193532 A | 7/2003 |
| JP | 2005127069 A | 5/2005 |
| JP | 2006152587 A | 6/2006 |
| JP | 2007120268 A | 5/2007 |
| JP | 2010222869 A | 10/2010 |
| KR | 20180078730 A | 7/2018 |
| WO | 2007068144 A1 | 6/2007 |
| WO | 2008080177 A1 | 7/2008 |
| WO | 2014003686 A1 | 1/2014 |
| WO | 2019077148 A1 | 4/2019 |
| WO | 2019107697 A1 | 6/2019 |
| WO | 2019178622 A1 | 9/2019 |

* cited by examiner

TOILET AND INDIVIDUAL EXCRETA DISPOSAL SYSTEM INCLUDING SAME

CROSS REFERENCE TO RELATED APPLICATIONS

This application is a National Stage application of PCT/KR2021/001155, filed Jan. 28, 2021, which claims the benefit of U.S. Provisional Application No. 63/030,777, filed May 27, 2020, the contents of which in their entirety are herein incorporated by reference.

TECHNICAL FIELD

The present disclosure relates to toilet bowls and individual urine and feces treatment systems.

BACKGROUND ART

Treatment of urine and feces discharged from home is required for human health and environmental protection. In regions where there is a shortage of urine and feces treatment facilities, urine and feces are preferably treated at each home individually. A household urine and feces treatment apparatus is required to individually treat urine and feces at home. However, regions where urine and feces treatment facilities are not properly equipped may be regions where water is scarce and electricity is not sufficiently supplied. Considering this, the household urine and feces treatment apparatus preferably consumes as little electricity and water as possible. In addition, the household urine and feces treatment apparatus is required to have a small size considering that it is used at home.

Manure provided to toilet bowls includes not only feces and urine excreted from humans, but also cleaning water and toilet bowl paper. Manure is a mixture of solid and liquid. For effective urine and feces treatment, solid and liquid need to be treated individually. It is required to separate mixed solid and liquid as a pre-step to individually treat solid and liquid.

SUMMARY

Provided is a toilet bowl that separates and discharges solid and liquid urine and feces.

Provided is a toilet bowl that consumes a small amount of water.

Provided is an individual urine and feces treatment system including a toilet bowl that separates and discharges solid and liquid urine and feces.

Provided is an individual urine and feces treatment system including a toilet bowl that consumes a small amount of water.

However, the problems to be solved are not limited to the above disclosure.

According to an aspect, a toilet bowl may include a main body defining a urine and feces transfer passage, and a collection member arranged in a first direction from the main body, wherein the main body includes a urine and feces transfer surface and a urine and feces separation surface arranged in the first direction, the urine and feces separation surface extends along a circumference of the urine and feces transfer passage, and separates mixed urine and feces transferred from the urine and feces transfer surface into liquid urine and feces and solid urine and feces, and the collection member accommodates each of the liquid urine and feces and the solid urine and feces.

The urine and feces separation surface may include a first point disposed at a height where a distance between the urine and feces separation surfaces in a third direction perpendicular to the first direction is minimum, and a radius of curvature of the urine and feces separation surface at the first point may be 21R to 39R.

The urine and feces separation surface may include a urine and feces separation region in which the mixed urine and feces is separated into the liquid urine and feces and the solid urine and feces, and the first point may be disposed in the urine and feces separation region.

The urine and feces separation surface may further include a second point provided between the first point and the urine and feces transfer surface, and the radius of curvature of the urine and feces separation surface at the second point may be 42R to 78R.

The urine and feces separation surface may include a third point provided between the first point and the collection member, and the radius of curvature of the urine and feces separation surface at the third point may be 49R to 91R.

A minimum radius of curvature of the urine and feces transfer surface may be 105R to 195R.

The collection member may include a separation wall dividing a liquid collection region collecting the liquid urine and feces and a solid collection region collecting the solid urine and feces, and the separation wall may overlap the main body in the first direction.

The liquid collection region may surround the solid collection region, and a surface of the separation wall on a side of the solid collection region may be aligned in the first direction and a first point disposed at a height at which the distance between the urine and feces separation surfaces in a third direction perpendicular to the first direction is minimum.

The toilet bowl may further include a plurality of cleaning nozzles disposed in an upper portion of the main body, and the plurality of cleaning nozzles may discharge cleaning water to rotate along the urine and feces transfer surface and the urine and feces separation surface and to move to the collection member.

The toilet bowl may further include a grinder grinding the solid urine and feces collected by the collection member.

The toilet bowl may further include a blocking member provided between the grinder and the collection member, and the blocking member may be open or closed to expose or cover the grinder.

The urine and feces separation surface may surround the urine and feces transfer passage.

According to an aspect, an individual urine and feces treatment system may include a toilet bowl separating and discharging mixed urine and feces into liquid urine and feces and solid urine and feces, and a liquid treatment apparatus obtaining cleaning water from the liquid urine and feces provided from the toilet bowl, wherein the toilet bowl comprises a main body defining a urine and feces transfer passage, and a collection member arranged in a first direction from the main body, the main body comprises a urine and feces transfer surface and a urine and feces separation surface arranged in the first direction, the urine and feces separation surface extends along a circumference of the urine and feces transfer passage, and separates the mixed urine and feces transferred from the urine and feces transfer surface into the liquid urine and feces and the solid urine and feces, and the collection member accommodates each of the liquid urine and feces and the solid urine and feces.

The individual urine and feces treatment system may further include a water tank connected to the toilet bowl and the liquid treatment apparatus, and the water tank may receive the cleaning water from the liquid treatment apparatus and provide the cleaning water to the toilet bowl.

The individual urine and feces treatment system may further include a solid treatment apparatus connected to the toilet bowl, and the solid treatment apparatus may treat the solid urine and feces provided from the toilet bowl.

The solid treatment apparatus may be connected to the liquid treatment apparatus to provide a liquid component of the solid urine and feces to the liquid treatment apparatus.

The urine and feces separation surface may include a first point disposed at a height where a distance between the urine and feces separation surfaces in a third direction perpendicular to the first direction is minimum, and a radius of curvature of the urine and feces separation surface at the first point may be 21R to 39R.

The urine and feces separation surface may include a urine and feces separation region in which the mixed urine and feces is separated into the liquid urine and feces and the solid urine and feces, and the first point may be disposed in the urine and feces separation region.

The collection member may include a separation wall dividing a liquid collection region collecting the liquid urine and feces and a solid collection region collecting the solid urine and feces, and the separation wall may overlap the main body in the first direction.

The liquid collection region may surround the solid collection region, and a surface of the separation wall on a side of the solid collection region may be aligned in the first direction and a first point disposed at a height at which the distance between the urine and feces separation surfaces in a third direction perpendicular to the first direction is minimum.

The individual urine and feces treatment system may further include a plurality of cleaning nozzles disposed in an upper portion of the main body, and the plurality of cleaning nozzles may discharge cleaning water to rotate along the urine and feces transfer surface and the urine and feces separation surface and to move to the collection member.

The individual urine and feces treatment system may further include a grinder grinding the solid urine and feces collected by the collection member.

The individual urine and feces treatment system may further include a blocking member provided between the grinder and the collection member, and the blocking member may be open or closed to expose or cover the grinder.

The urine and feces separation surface may surround the urine and feces transfer passage.

The present disclosure may provide a toilet bowl that separates and discharges solid and liquid urine and feces.

The present disclosure may provide a toilet bowl that consumes a small amount of water.

The present disclosure may provide individual urine and feces treatment system including a toilet bowl that separates and discharges solid and liquid urine and feces.

The present disclosure may provide an individual urine and feces treatment system including a toilet bowl that consumes a small amount of water.

However, the effects of the disclosure are not limited to the above disclosure.

DETAILED DESCRIPTION

Figure 1:
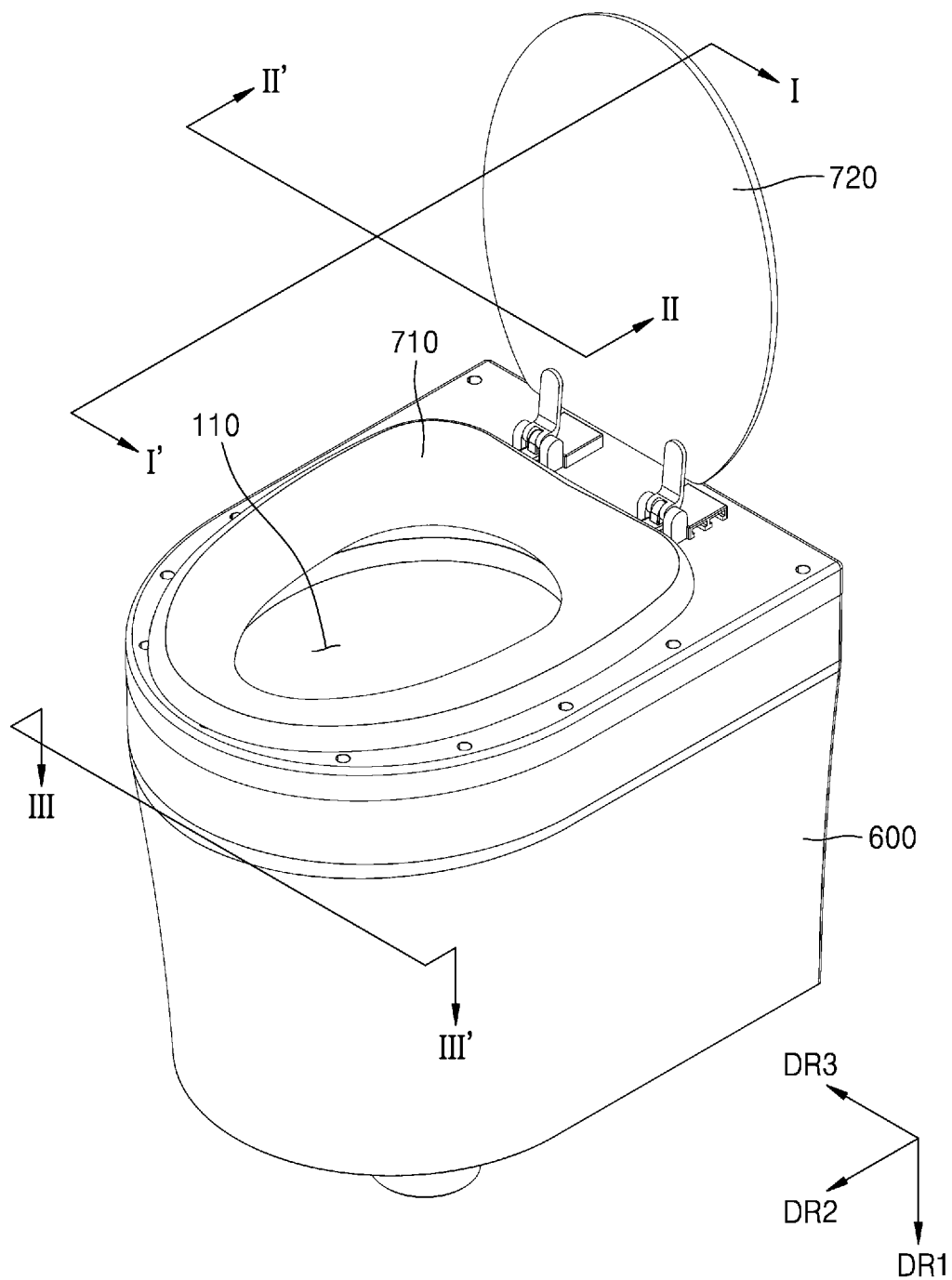
FIG. 1 is a perspective view of a toilet bowl according to an example embodiment.

According to an aspect, a toilet bowl may include a main body defining a urine and feces transfer passage, and a collection member arranged in a first direction from the main body, wherein the main body includes a urine and feces transfer surface and a urine and feces separation surface arranged in the first direction, the urine and feces separation surface extends along a circumference of the urine and feces transfer passage, and separates mixed urine and feces transferred from the urine and feces transfer surface into liquid urine and feces and solid urine and feces, and the collection member accommodates each of the liquid urine and feces and the solid urine and feces.

According to an aspect, an individual urine and feces treatment system may include a toilet bowl separating and discharging mixed urine and feces into liquid urine and feces and solid urine and feces, and a liquid treatment apparatus obtaining cleaning water from the liquid urine and feces provided from the toilet bowl, wherein the toilet bowl comprises a main body defining a urine and feces transfer passage, and a collection member arranged in a first direction from the main body, the main body comprises a urine and feces transfer surface and a urine and feces separation surface arranged in the first direction, the urine and feces separation surface extends along a circumference of the urine and feces transfer passage, and separates the mixed urine and feces transferred from the urine and feces transfer surface into the liquid urine and feces and the solid urine and feces, and the collection member accommodates each of the liquid urine and feces and the solid urine and feces.

Hereinafter, embodiments of the present disclosure will be described in detail with reference to the accompanying drawings. In the following drawings, the same reference numerals refer to the same components, and the size of each component in the drawings may be exaggerated for clarity and convenience of description. Meanwhile, the embodiments described below are merely exemplary, and various modifications are possible from these embodiments.

Hereinafter, what is referred to as "on" may include not only directly above in contact, but also above in non-contact.

The singular expression includes the plural expression unless the context clearly dictates otherwise. Also, when a part "includes" a certain component, it means that other components may be further included, rather than excluding other components, unless otherwise stated.

Figure 2:
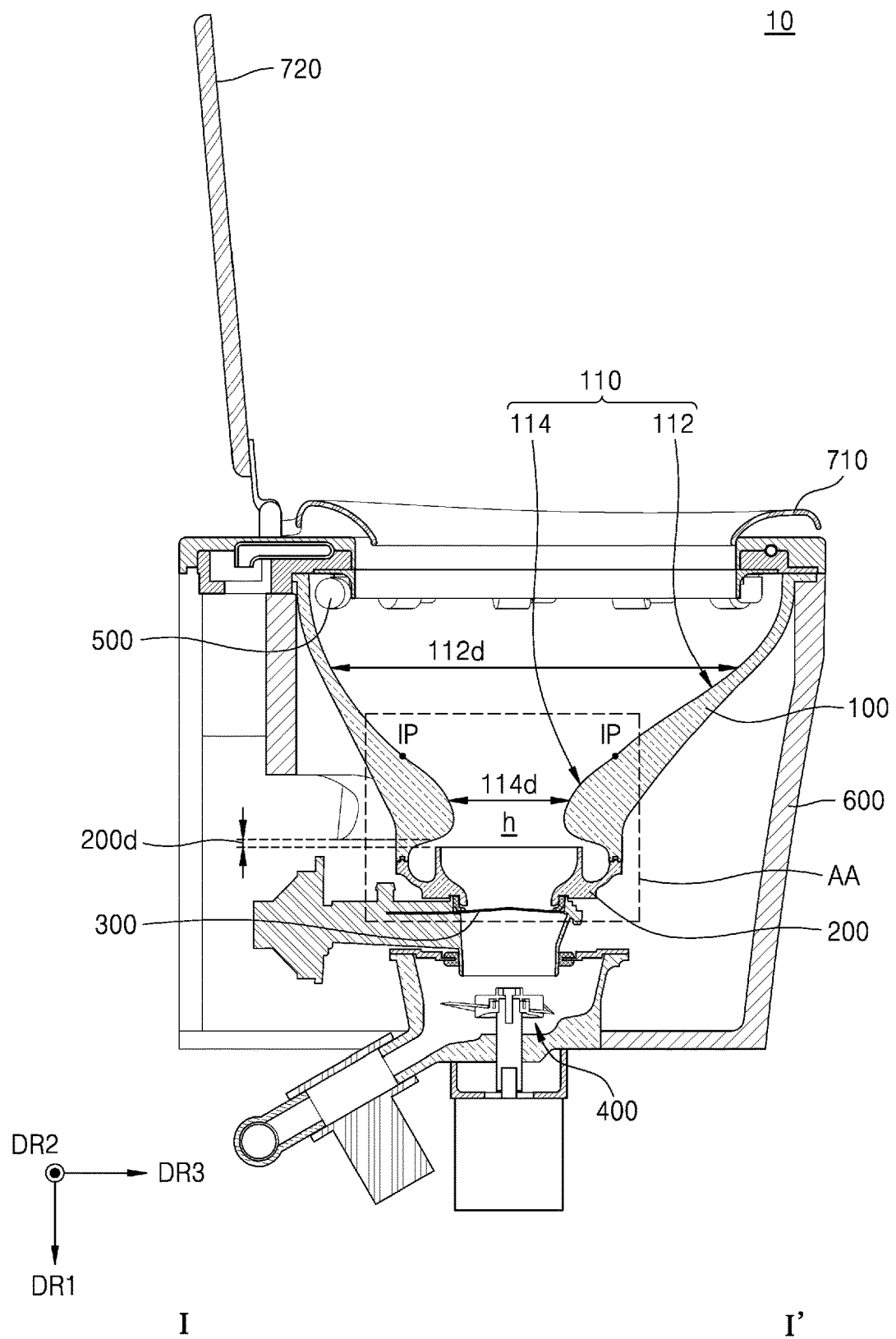
FIG. 2 is a cross-sectional view taken along line I-I' of FIG. 1.
Figure 3:
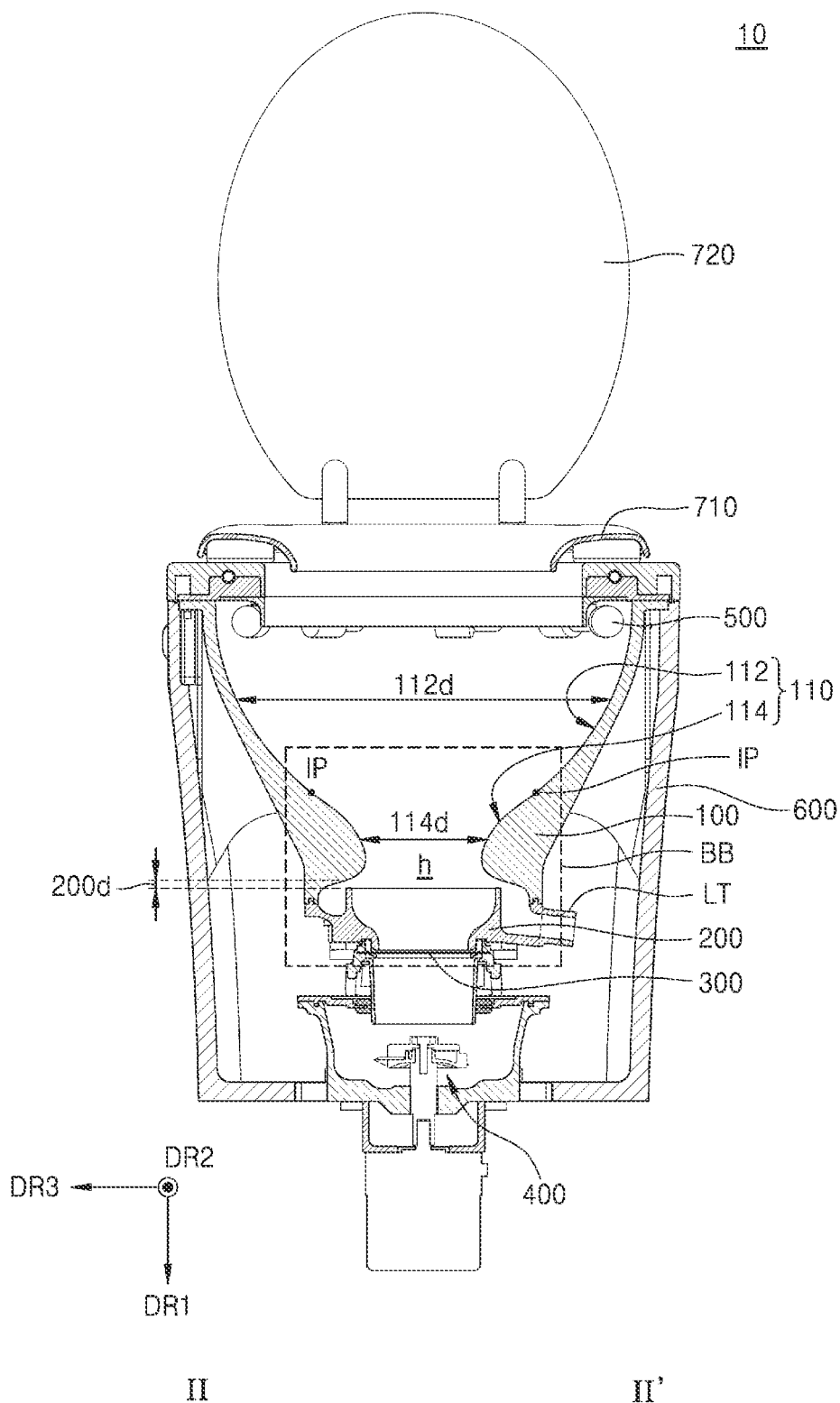
FIG. 3 is a cross-sectional view taken along line II-II' of FIG. 1.
Figure 4:
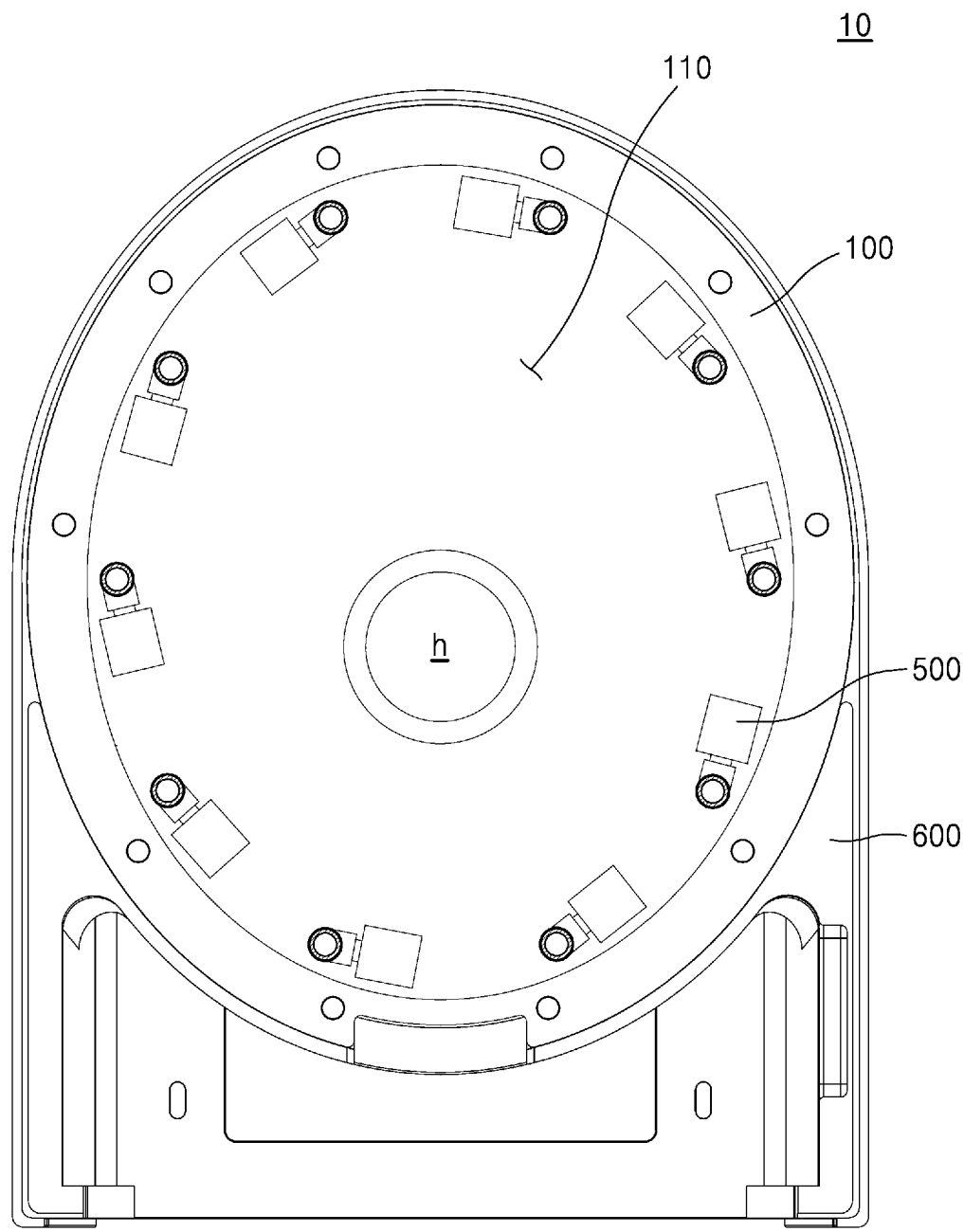
FIG. 4 is a cross-sectional view taken along line III-III' of FIG. 1.
Figure 5:
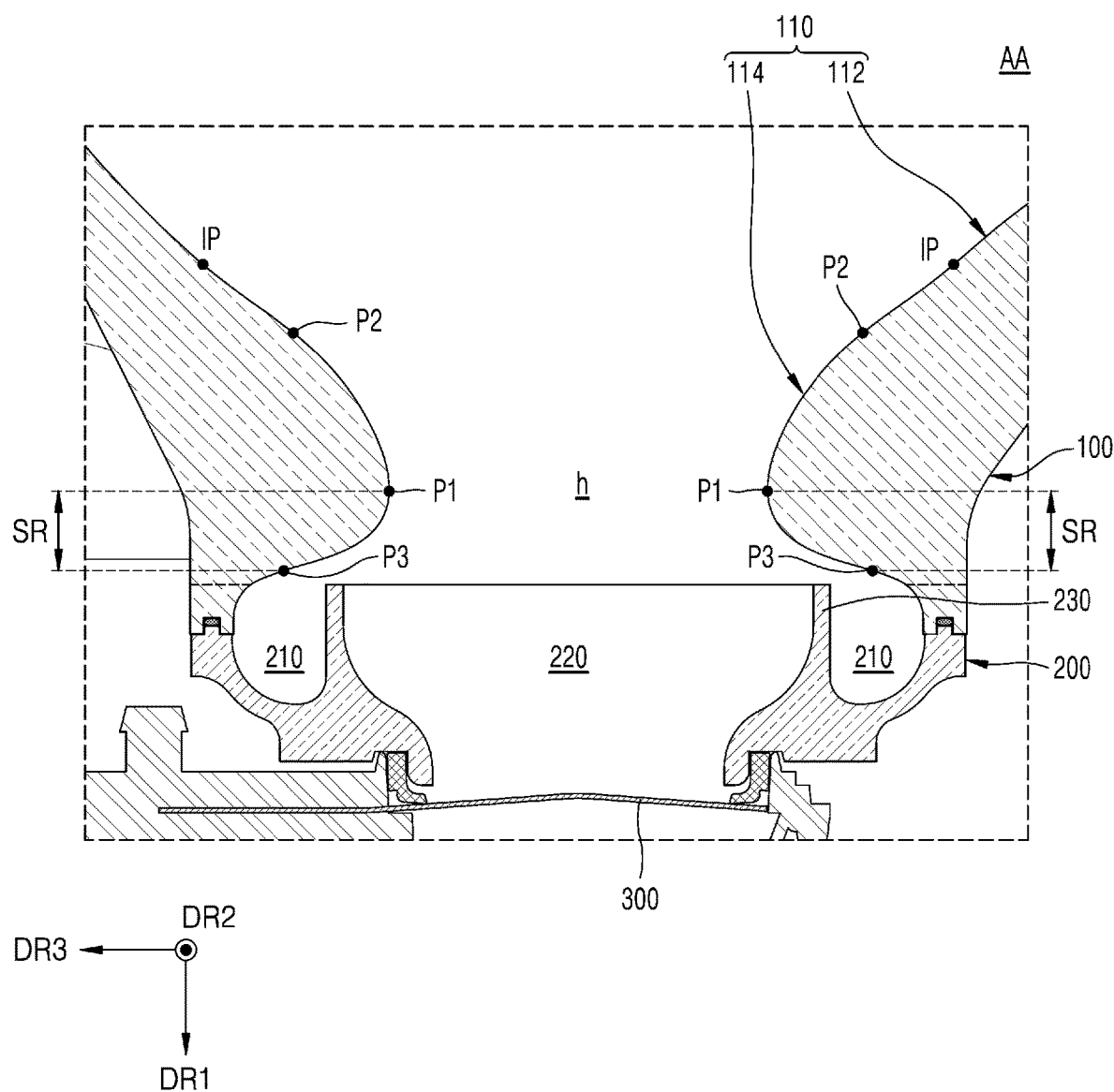
FIG. 5 is an enlarged view of part AA of FIG. 2.
Figure 6:
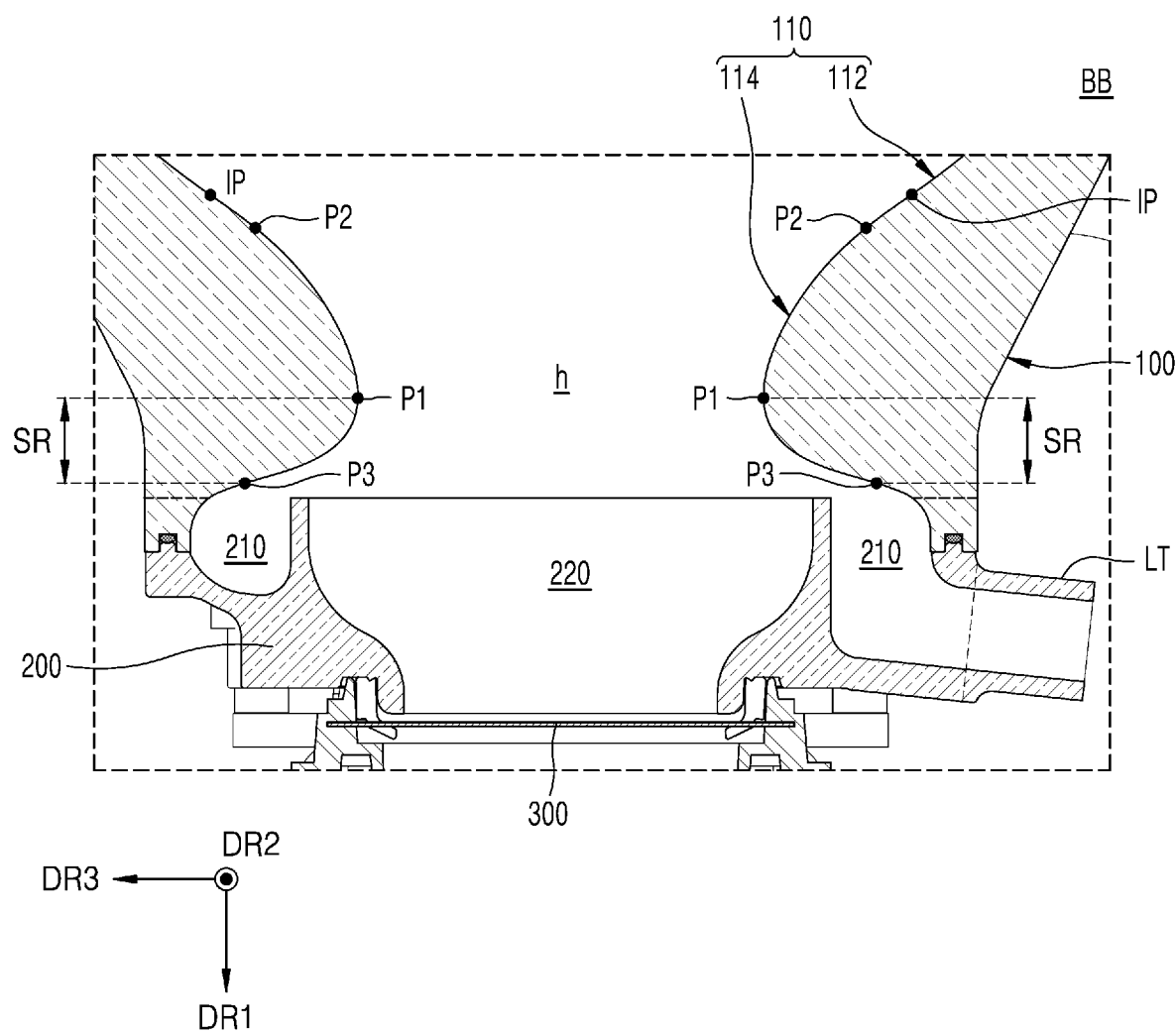
FIG. 6 is an enlarged view of a part BB of FIG. 3.
Figure 7:
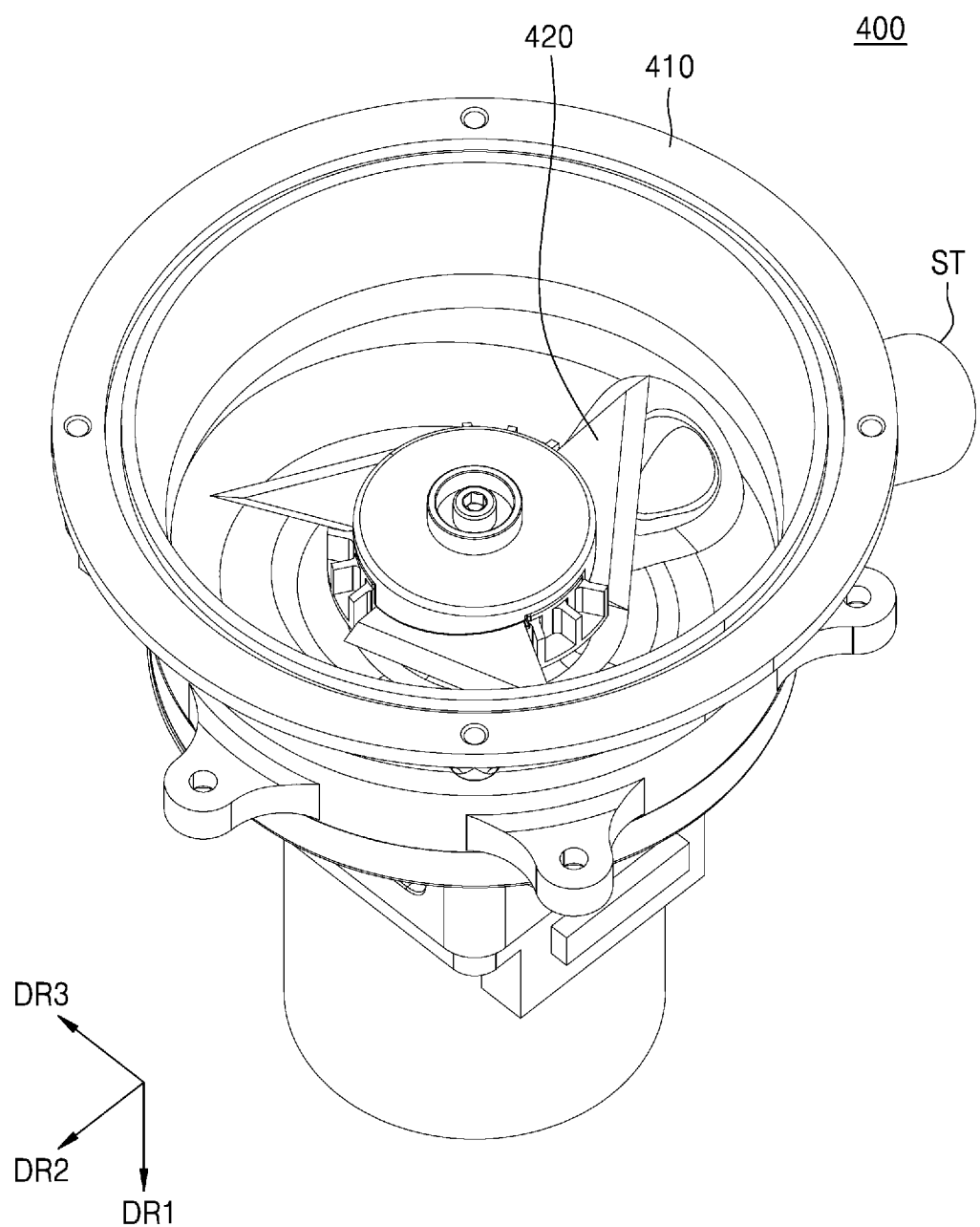
FIG. 7 is a perspective view illustrating a grinder of FIG. 1.

FIG. 1 is a perspective view of a toilet bowl according to an example embodiment. FIG. 2 is a cross-sectional view taken along line I-I' of FIG. 1. FIG. 3 is a cross-sectional view taken along line II-II' of FIG. 1. FIG. 4 is a cross-sectional view taken along line III-III' of FIG. 1. FIG. 5 is an enlarged view of part AA of FIG. 2. FIG. 6 is an enlarged view of a part BB of FIG. 3. FIG. 7 is a perspective view illustrating a grinder of FIG. 1.

Referring to FIGS. 1 to 7, a toilet bowl 10 may be provided. The toilet bowl 10 may include a main body 100, a collection member 200, a blocking member 300, and a grinder 400. The main body 100 may transfer mixed urine and feces. For example, the mixed urine and feces may be a mixture of liquid urine and feces (e.g., urine), solid urine and feces (e.g., feces), toilet bowl paper, and cleaning water provided from a user of the toilet bowl 10. The main body 100 may separate the mixed urine and feces into liquid urine and feces and solid urine and feces. Liquid urine and feces may refer to a liquid part of the mixed urine and feces. For example, liquid urine and feces may include at least one of urine or cleaning water. Solid urine and feces may refer to a solid part of the mixed urine and feces. For example, solid urine and feces may include at least one of feces or toilet bowl paper. The separation of mixed urine and feces will be described below.

The main body 100 may have a hollow cylinder shape. The main body 100 may include an inner surface 110. The inner surface 110 may include a urine and feces transfer surface 112 and a urine and feces separation surface 114. The urine and feces transfer surface 112 and the urine and feces separation surface 114 may define a urine and feces transfer passage h. The urine and feces transfer surface 112 and the urine and feces separation surface 114 may be disposed in upper and lower portions of the main body 100, respectively. The upper and lower portions of the main body 100 may be sequentially arranged in a first direction DR1 parallel to an arrangement direction of the main body 100 and the collection member 200. The urine and feces transfer surface 112 may receive the mixed urine and feces from the user, and transfer the mixed urine and feces to the lower portion of the main body 100. The urine and feces transfer surface 112 may extend along the circumference of the urine and feces transfer passage h. For example, the urine and feces transfer surface 112 may surround the urine and feces transfer passage h. The urine and feces transfer surface 112 may have a concave shape. For example, a distance 112d of the urine and feces transfer surface 112 may be reduced in the first direction DR1. The distance 112d of the urine and feces transfer surface 112 may be a distance between two points of the urine and feces transfer surface 112 facing each other in a direction (e.g., a second direction DR2 or a third direction DR3) perpendicular to the first direction DR1. The distance 112d of the urine and feces transfer surface 112 may refer to a width of the urine and feces transfer passage h defined by the urine and feces transfer surface 112. The urine and feces transfer surface 112 may have a certain radius of curvature so that the mixed urine and feces has a suitable speed so as to be separated into liquid urine and feces and solid urine and feces on the urine and feces separation surface 114. For example, the minimum radius of curvature of the urine and feces transfer surface 112 may be 105R to 195R. When the minimum radius of curvature of the urine and feces transfer surface 112 is less than 105R, the mixed urine and feces is provided to the urine and feces separation surface 114 too quickly, which may be difficult to separate the mixed urine and feces into liquid urine and feces and solid urine and feces. When the minimum radius of curvature of the urine and feces transfer surface 112 is greater than 195R, a large amount of cleaning water may be required to provide sufficient cleaning power to transfer the mixed urine and feces.

The urine and feces separation surface 114 may separate the mixed urine and feces coming down to the urine and feces separation surface 114 along the urine and feces transfer surface 112 into liquid urine and feces and solid urine and feces. The urine and feces separation surface 114 may extend along the circumference of the urine and feces transfer passage h. For example, the urine and feces separation surface 114 may surround the urine and feces transfer passage h. In an example, the urine and feces separation surface 114 may separate the mixed urine and feces provided from the entire region of the urine and feces transfer surface 112 into liquid urine and feces and solid urine and feces. The urine and feces separation surface 114 may have a convex shape. Accordingly, inflection points IP of the inner surface 110 may be provided at a boundary between the urine and feces separation surface 114 and the urine and feces transfer surface 112. For example, a distance 114d of the urine and feces separation surface 114 may decrease and then increase in the first direction DR1. The distance 114d of the urine and feces separation surface 114 may be a distance between two points of the urine and feces separation surface 114 facing each other in a direction (e.g., the second direction DR2 or the third direction DR3) perpendicular to the first direction DR1. The distance 114d of the urine and feces separation surface 114 may refer to a width of the urine and feces transfer passage h defined by the urine and feces separation surface 114. The urine and feces separation surface 114 may have a radius of curvature for separating the mixed urine and feces into liquid urine and feces and solid urine and feces. For example, a first point P1 on the urine and feces separation surface 114 at which the distance 114d of the urine and feces separation surface 114 is the minimum may have a radius of curvature of 21R to 39R. When the radius of curvature of the first point P1 is less than 21R or greater than 39R, the solid urine and feces and liquid urine and feces may not be separated to the required level. In an example, a second point P2 disposed between the first point P1 and the inflection point IP of the urine and feces separation surface 114 may have a radius of curvature of 42R to 79R. In an example, a third point P3 disposed between the first point P1 of the urine and feces separation surface 114 and the collection member 200 may have a radius of curvature of 49R to 91R.

A portion of between the first point P1 and the third point P3 may be referred to as a urine and feces separation region SR. The mixed urine and feces may be separated into solid urine and feces and liquid urine and feces in the urine and feces separation region SR. The solid urine and feces may fall from the urine and feces separation region SR to a solid collection region 220 to be described below. For example, the solid urine and feces may be separated from the urine and feces separation surface 114 at the first point P1. The liquid urine and feces may be further transferred along the urine and feces separation surface 114 by surface tension and provided to a liquid collection region 210 through the first point P1.

The collection member 200 may provide the liquid collection region 210 and the solid collection region 220. The collection member 200 may include a separation wall 230 dividing the liquid collection region 210 and the solid collection region 220. The separation wall 230 may extend between liquid collection region 210 and solid collection region 220. The separation wall 230 may overlap the main body 100 in the first direction DR1. In an example, a surface of the separation wall 230 on a side of the solid collection region 220 may be aligned with the first point P1 of the urine and feces separation surface 114 and the first direction DR1. A distance 200d between the separation wall 230 and the urine and feces separation surface 114 may be determined so that the solid urine and feces does not fall into the liquid collection region 210. For example, the distance 200d between the separation wall 230 and the urine and feces separation surface 114 may be 4 cm to 8 cm. Accordingly, solid urine and feces and liquid urine and feces may be separated to the required level.

The liquid collection region 210 may collect liquid urine and feces provided from the urine and feces separation surface 114. Side and lower surfaces of the liquid collection region 210 may be defined by the collection member 200. In other words, the side and lower surfaces of the liquid collection region 210 may be covered by the collection member 200. An upper portion of the liquid collection region 210 may be open. The liquid urine and feces may be provided into the liquid collection region 210 through the upper portion of the liquid collection region 210. From a viewpoint in the first direction DR1 (i.e., a viewpoint looking down the toilet bowl 10), the liquid collection region 210 may have a ring shape. Accordingly, the liquid collection region 210 may accommodate the liquid urine and feces provided from the entire region of the urine and feces separation surface 114. A liquid transfer tube LT may be connected to the liquid collection region 210. The liquid transfer tube LT may transfer liquid urine and feces 1 to a liquid treatment apparatus (not shown) outside the toilet bowl 10.

The solid collection region 220 may collect solid urine and feces provided from the urine and feces separation surface 114 or solid urine and feces passing directly between the urine and feces separation surfaces 114. The solid collection region 220 may be surrounded by the liquid collection region 210. Side surfaces of the solid collection region 220 may be defined by the collection member 200. In other words, the side surfaces of the solid collection region 220 may be covered by the collection member 200. An upper portion of the solid collection region 220 may be open. The solid urine and feces may be provided into the solid collection region 220 through the upper portion of the solid collection region 220. From a viewpoint in the first direction DR1, the solid collection region 220 may be exposed by the urine and feces transfer passage h surrounded by the urine and feces separation surface 114.

The blocking member 300 may be provided on a lower surface of the solid collection region 220. The blocking member 300 may be provided between the solid collection region 220 and the grinder 400. The blocking member 300 may be openable and closable. When the blocking member 300 is closed, the solid urine and feces may remain in the solid collection region 220. When the blocking member 300 is opened, the solid urine and feces may be moved to the grinder 400 to be described below through the solid collection region 220. The blocking member 300 may protect the user of the toilet bowl 10 by preventing a grinder from being exposed, and may prevent an object other than urine and feces from being damaged by the grinder when the object falls in the toilet bowl 10. Furthermore, the blocking member 300 may block smell from a solid treatment apparatus (not shown) treating solid urine and feces.

The grinder 400 may include a plurality of rotatable blades 420. Three blades 420 are shown, but this is just an example. In another example, there may be less or more than three blades 420. The grinder 400 may grind the solid urine and feces. The grinder 400 may be connected to the solid transfer tube ST. The solid transfer tube ST may receive the ground solid urine and feces from the grinder 400 and transfer the ground solid urine and feces to the solid treatment apparatus (not shown) outside the toilet bowl 10. In an example, the efficiency of treatment of solid urine and feces may be improved by grinding and providing solid urine and feces to the solid treatment apparatus (not shown).

A plurality of cleaning nozzles 500 may be provided on the urine and feces transfer surface 112. For example, the plurality of cleaning nozzles 500 may be provided adjacent to the upper portion of the urine and feces transfer surface 112. The plurality of cleaning nozzles 500 may spray cleaning water on the urine and feces transfer surface 112. The plurality of cleaning nozzles 500 may adjust a spraying direction of the cleaning water so that the cleaning water flushes while rotating along the inner surface 110 of the main body 100. When the cleaning water flushes while rotating along the inner surface 110 of the main body 100, the cleaning power required with a smaller amount of cleaning water may be provided than when the cleaning water goes down without rotating along the inner surface 110 of the main body 100. Accordingly, water used in the toilet bowl 10 may be saved.

A case 600, a seat 710, and a cover 720 may be provided. The case 600 may surround the main body 100, the collection member 200, the blocking member 300, and the grinder 400. The seat 710 may be provided on the main body 100 so that the user of the toilet bowl 10 may sit. The cover 720 may be provided on the seat 710 to cover or expose the seat 710.

In order to efficiently treat mixed urine and feces, liquid urine and feces and solid urine and feces need to be treated individually. The toilet bowl 10 of the present disclosure may separate the mixed urine and feces into liquid urine and feces and solid urine and feces only with the urine and feces separation surface 114 and the collection member 200. Therefore, the toilet bowl 10 of the present disclosure may be suitable for use in a situation where the mixed urine and feces need to be directly treated. The situation where the mixed urine and feces need to be directly treated may be, for example, a situation where the mixed urine and feces need to be treated in a region where a large-scale urine and feces treatment facility collecting and treating the mixed urine and feces discharged from home is not equipped.

According to the present disclosure, a separate apparatus for separating the mixed urine and feces into liquid urine and feces and solid urine and feces and power (e.g., electricity) for operating the apparatus are not required. Therefore, the present disclosure may minimize a urine and feces treatment system, and may also reduce the power required to operate the urine and feces treatment system.

Figure 8:
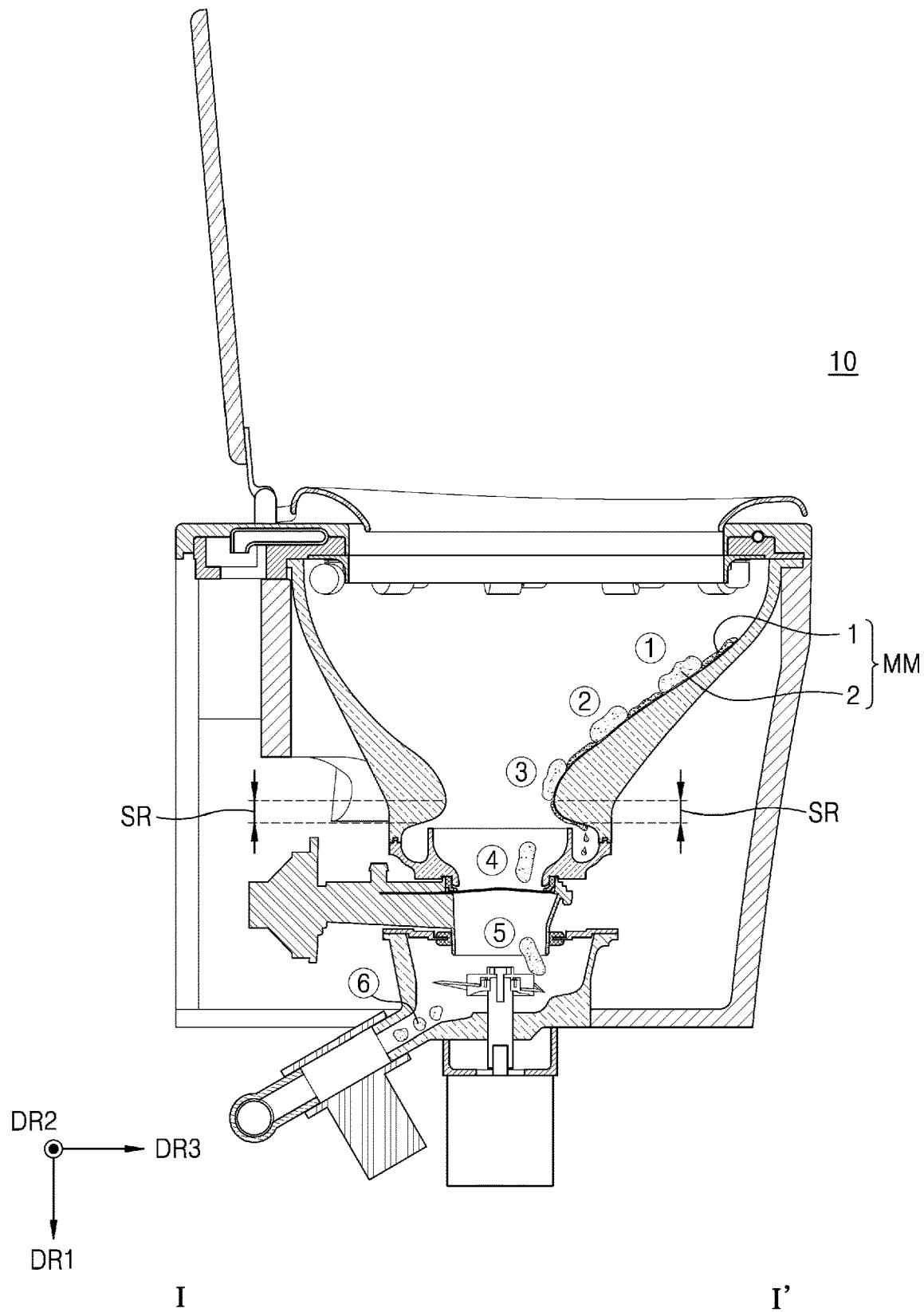
FIG. 8 is a cross-sectional view taken along line I-I' of FIG. 1 illustrating an operation method of a toilet bowl of FIG. 1.
Figure 9:
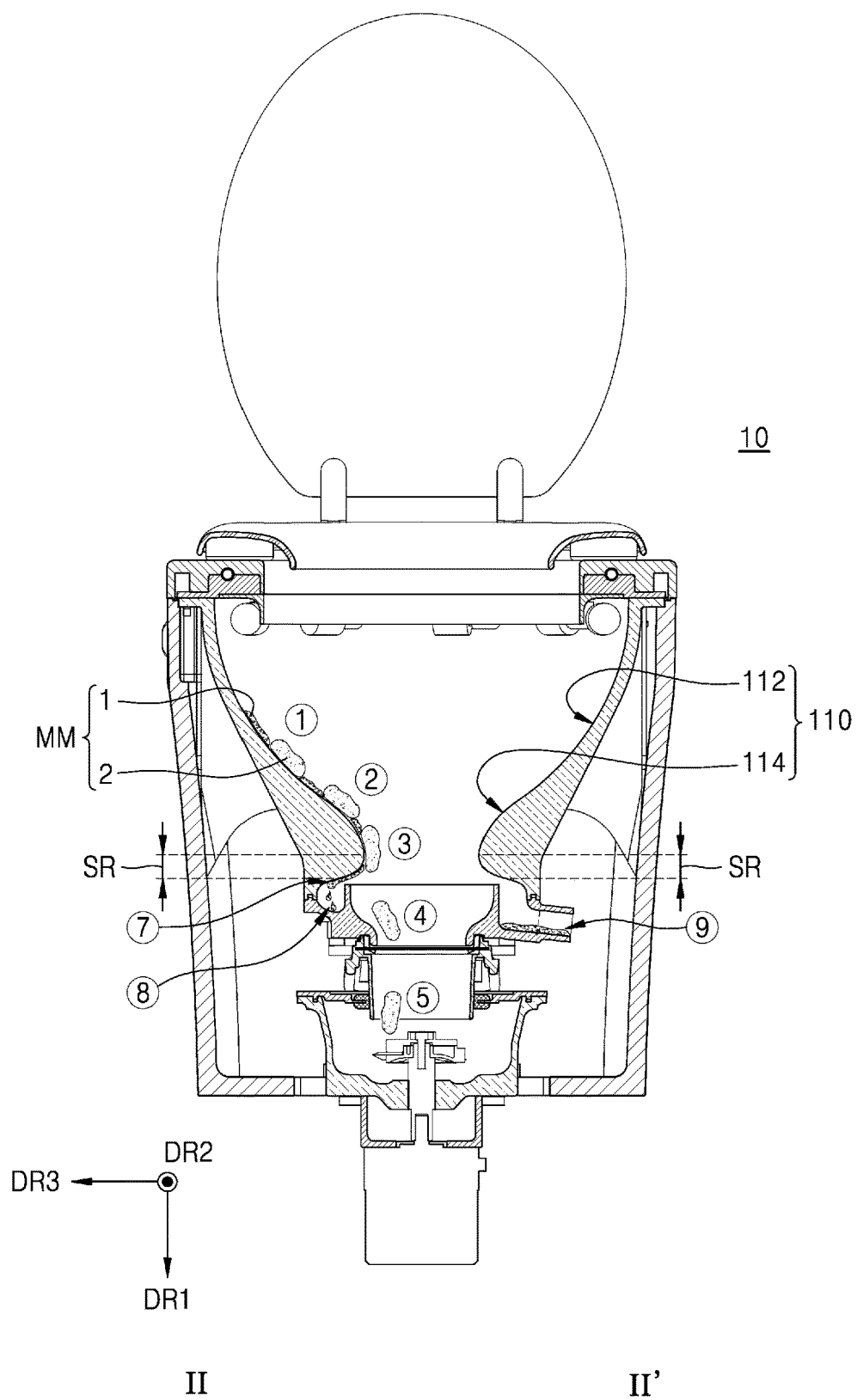
FIG. 9 is a cross-sectional view taken along line II-II' of FIG. 1 illustrating the operation method of the toilet bowl of FIG. 1.
Figure 10:
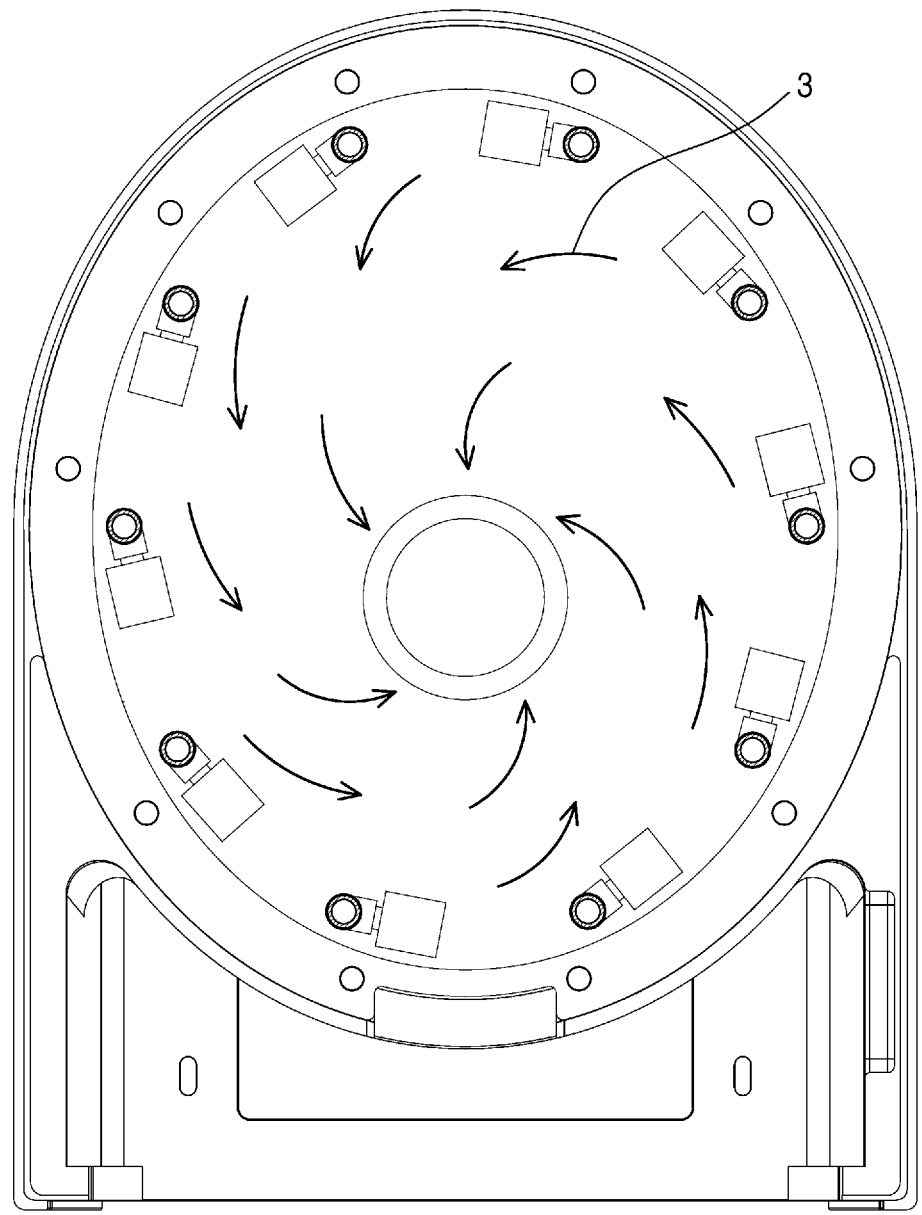
FIG. 10 is a cross-sectional view taken along line III-III' of FIG. 1 illustrating the operation method of the toilet bowl of FIG. 1.

FIG. 8 is a cross-sectional view taken along line I-I' of FIG. 1 illustrating an operation method of a toilet bowl of FIG. 1. FIG. 9 is a cross-sectional view taken along line II-II' of FIG. 1 illustrating the operation method of the toilet bowl of FIG. 1. FIG. 10 is a cross-sectional view taken along line III-III' of FIG. 1 illustrating the operation method of the toilet bowl of FIG. 1.

Referring to FIGS. 8 to 10, mixed urine and feces MM may be provided on the urine and feces transfer surface 112 (①). The mixed urine and feces MM may include liquid manure 1 and solid manure 2. For example, the liquid urine and feces 1 may include urine and cleaning water. For example, the solid urine and feces 2 may include feces and toilet bowl paper. The liquid urine and feces 1 and the solid urine and feces 2 may reach the urine and feces separation surface 114 through the urine and feces transfer surface 112 (②). For convenience of explanation, the liquid urine and feces 1 and the solid urine and feces 2 move directly toward the urine and feces separation surface 114 without rotation in FIGS. 8 and 9. Because the plurality of cleaning nozzles 500 discharge cleaning water so that the cleaning water flushes while rotating, the liquid urine and feces 1 and the solid urine and feces 2 may go down while rotating together with the cleaning water. However, in some cases, the solid urine and feces 2 may move to the urine and feces separation surface 114 without rotating regardless of the flow of cleaning water. A flow 3 of cleaning water is shown in FIG. 10.

The solid urine and feces 2 and the liquid urine and feces 1 may reach the urine and feces separation region SR of the urine and feces separation surface 114 (③). The urine and feces separation region SR may be a region in which the solid urine and feces 2 and the liquid urine and feces 1 are separated. For example, the urine and feces separation region SR may be a region between the first point P1 and the third point P3 shown in FIGS. 5 and 6. The solid urine and feces 2 may fall from the urine and feces separation surface 114 to the solid collection region 220 (④). When the blocking member 300 is opened, the solid urine and feces 2 may move to the grinder 400 (⑤). The solid urine and feces 2 may be finely ground by the grinder 400 and discharged to the outside of the toilet bowl 10 (⑥).

The liquid urine and feces 1 may not fall from the urine and feces separation surface 114 in the urine and feces separation region SR, unlike the solid urine and feces 2. The liquid urine and feces 1 may fall from the urine and feces separation surface 114 after further progressing along the urine and feces separation surface 114 (⑦). The liquid urine and feces 1 may move to the liquid collection region 210 (⑧). The liquid urine and feces 1 may be discharged to the outside of the toilet bowl 10 through the liquid transfer tube LT (⑨).

Through the above process, the toilet bowl 10 of the present disclosure may separate and collect the solid urine and feces 2 and the liquid urine and feces 1. Accordingly, the efficiency of treatment of urine and feces may be improved.

Figure 11:
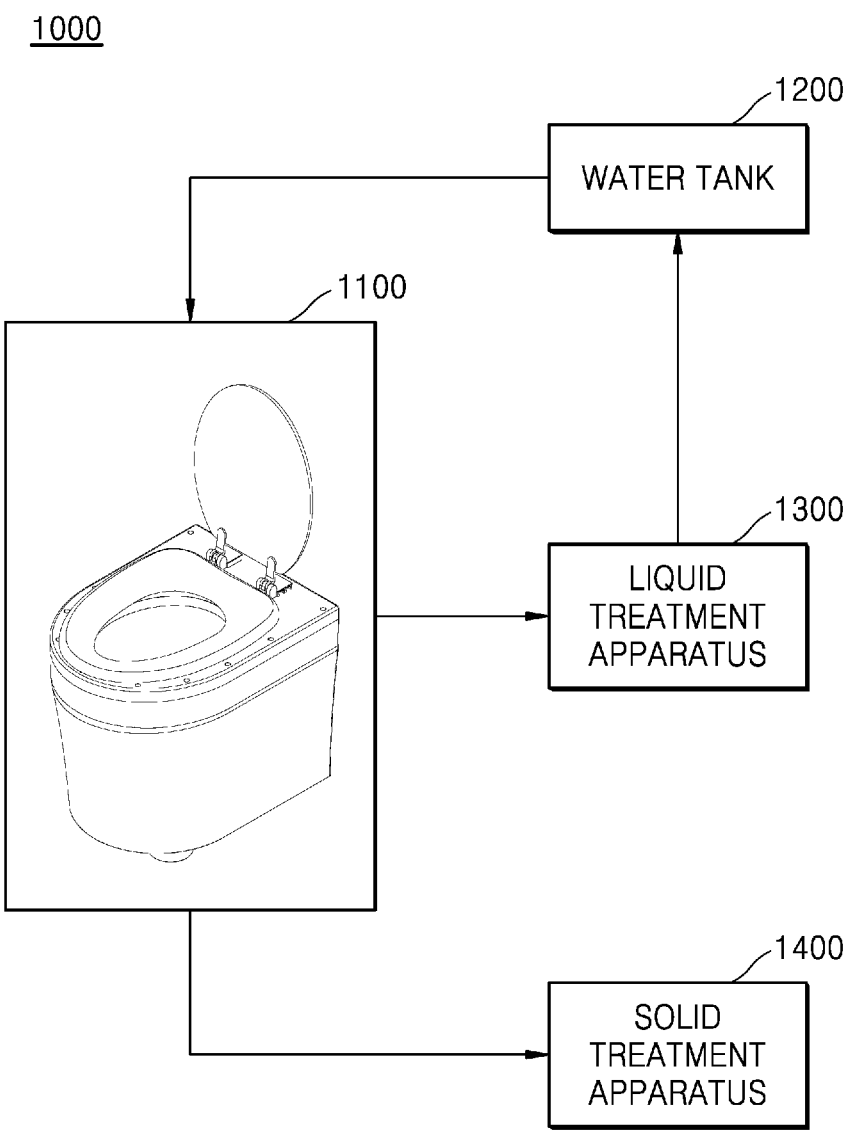
FIG. 11 is a block diagram of an individual urine and feces treatment system according to an example embodiment.

FIG. 11 is a block diagram of an individual urine and feces treatment system according to an example embodiment. For brevity of description, the substantially same descriptions as those given with reference to FIGS. 1 to 10 may not be repeated.

Referring to FIG. 11, an individual urine and feces treatment system 1000 may be provided. The individual urine and feces treatment system 1000 may include a toilet bowl 1100, a water tank 1200, a liquid treatment apparatus 1300, and a solid treatment apparatus 1400. The toilet bowl 1100 may be substantially the same as the toilet bowl 10 described with reference to FIGS. 1 to 10.

The water tank 1200 may provide cleaning water to the toilet bowl 1100. The water tank 1200 may be coupled to the toilet bowl 1100 or separated from the toilet bowl 1100.

The liquid treatment apparatus 1300 may obtain liquid urine and feces from the toilet bowl 1100. The liquid treatment apparatus 1300 may generate cleaning water by purifying liquid urine and feces. The liquid treatment apparatus 1300 may supply cleaning water to the water tank 1200. The individual urine and feces treatment system 1000 of the present disclosure uses cleaning water generated from liquid urine and feces, thereby saving water supplied from the outside of the individual urine and feces treatment system 1000.

The solid treatment apparatus 1400 may obtain solid urine and feces from the toilet bowl 1100. The solid treatment apparatus 1400 may treat the solid urine and feces in various ways. For example, the solid treatment apparatus 1400 may dry and then incinerate the solid urine and feces. In an embodiment, the solid treatment apparatus 1400 may dehydrate the solid urine and feces obtained from the toilet bowl 1100 to obtain a liquid, and supply the liquid to the liquid treatment apparatus 1300.

The individual urine and feces treatment system 1000 of the present disclosure may treat liquid urine and feces and solid urine and feces itself. Accordingly, the individual urine and feces treatment system 1000 of the present disclosure may be suitable for use in an environment where a facility collecting and treating urine and feces is not equipped.

The above description of embodiments of the technical idea of the present disclosure provides an example for the description of the technical idea of the present disclosure. Therefore, the technical spirit of the present disclosure is not limited to the above embodiments, and it is apparent that many modifications and changes can be made by combining and embodying the above embodiments by those of ordinary skill in the art within the technical spirit of the present disclosure.

The invention claimed is:

1. A toilet bowl comprising:
   a main body defining a urine and feces transfer passage; and
   a collection member to accommodate liquid urine and feces and solid urine and feces, wherein the collection member is arranged in a first direction from the main body,
   wherein the main body comprises a urine and feces transfer surface and a urine and feces separation surface to separate mixed urine and feces transferred from the urine and feces transfer surface into the liquid urine and feces and the solid urine and feces,
   the urine and feces separation surface is arranged in the first direction from the urine and feces transfer surface,
   the urine and feces separation surface extends along a circumference of the urine and feces transfer passage,
   the urine and feces separation surface comprises a first point disposed at a height where a distance between the urine and feces separation surface in a third direction perpendicular to the first direction is minimum, and
   a radius of curvature of the urine and feces separation surface at the first point is 21R to 39R,
   wherein the urine and feces separation surface comprises a third point provided between the first point and the collection member, and
   the radius of curvature of the urine and feces separation surface at the third point in the first direction is 49R to 91R,
   wherein the collection member comprises
   a separation wall dividing a liquid collection region collecting the liquid part of the mixed urine and feces and a solid collection region collecting the solid part of the mixed urine and feces, and
   the separation wall overlaps the main body in the first direction.

2. The toilet bowl of claim 1,
   wherein the urine and feces separation surface comprises a urine and feces separation region to separate the mixed urine and feces into the liquid urine and feces and the solid urine and feces, and
   the first point is disposed in the urine and feces separation region.

3. The toilet bowl of claim 1,
wherein the urine and feces separation surface further comprises a second point provided between the first point and the urine and feces transfer surface, and
the radius of curvature of the urine and feces separation surface at the second point is 42R to 78R.

4. The toilet bowl of claim 1, wherein a minimum radius of curvature of the urine and feces transfer surface is 105R to 195R.

5. The toilet bowl of claim 1,
wherein the liquid collection region surrounds the solid collection region, and
a surface of the separation wall on a side of the solid collection region is aligned in the first direction and a first point disposed at a height at which the distance between the urine and feces separation surface in a third direction perpendicular to the first direction is minimum.

6. The toilet bowl of claim 1, further comprising: a plurality of cleaning nozzles disposed in an upper portion of the main body,
the plurality of cleaning nozzles to discharge cleaning water to rotate along the urine and feces transfer surface and the urine and feces separation surface and to move to the collection member.

7. The toilet bowl of claim 1, further comprising:
a grinder to grind the solid urine and feces collected by the collection member.

8. The toilet bowl of claim 7, further comprising: a blocking member provided between the grinder and the collection member,
the blocking member to open or close to expose or cover the grinder.

9. The toilet bowl of claim 1, wherein the urine and feces separation surface surrounds the urine and feces transfer passage.

10. An individual urine and feces treatment system comprising:
a toilet bowl to separate and discharge mixed urine and feces into liquid urine and feces and solid urine and feces; and
a liquid treater to obtain cleaning water from the liquid urine and feces provided from the toilet bowl,
wherein the toilet bowl comprises a main body defining a urine and feces transfer passage, and a collection member to accommodate the liquid urine and feces and the solid urine and feces,
the collection member is arranged in a first direction from the main body,
the main body comprises a urine and feces transfer surface and a urine and feces separation surface to separate the mixed urine and feces transferred from the urine and feces transfer surface into the liquid urine and feces and the solid urine and feces,
the urine and feces separation surface is arranged in the first direction from the urine and feces transfer surface, and
the urine and feces separation surface extends along a circumference of the urine and feces transfer passage,
the urine and feces separation surface comprises a first point disposed at a height where a distance between the urine and feces separation surface in a third direction perpendicular to the first direction is minimum, and
a radius of curvature of the urine and feces separation surface at the first point is 21R to 39R,
wherein the urine and feces separation surface comprises a third point provided between the first point and the collection member, and
the radius of curvature of the urine and feces separation surface at the third point in the first direction is 49R to 91R,
wherein the collection member comprises
a separation wall dividing a liquid collection region collecting the liquid part of the mixed urine and feces and a solid collection region collecting the solid part of the mixed urine and feces, and
the separation wall overlaps the main body in the first direction.

11. The individual urine and feces treatment system of claim 10, further comprising: a water tank connected to the toilet bowl and the liquid treater,
the water tank to receive the cleaning water from the liquid treater and provide the cleaning water to the toilet bowl.

12. The individual urine and feces treatment system of claim 10, further comprising:
a solid treater connected to the toilet bowl,
the solid treater to treat the solid urine and feces provided from the toilet bowl.

13. The individual urine and feces treatment system of claim 12, wherein the solid treater is connected to the liquid treater to provide a liquid component of the solid urine and feces to the liquid treater.

14. The individual urine and feces treatment system of claim 10,
wherein the urine and feces separation surface comprises a urine and feces separation region to separate the mixed urine and feces into the liquid urine and feces and the solid urine and feces, and
the first point is disposed in the urine and feces separation region.

15. The individual urine and feces treatment system of claim 10, wherein the urine and feces separation surface surrounds the urine and feces transfer passage.

* * * * *